Patented June 14, 1938

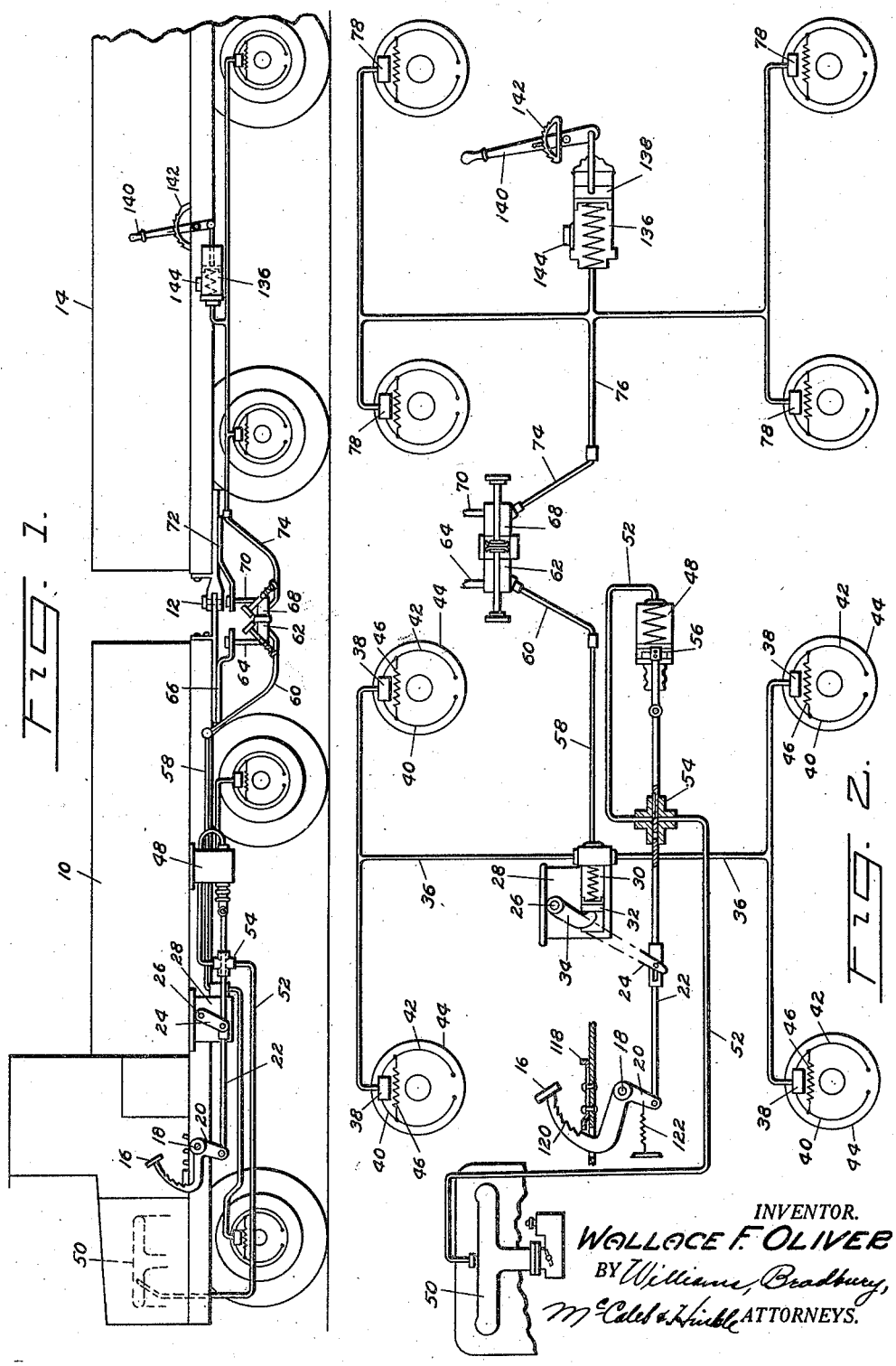

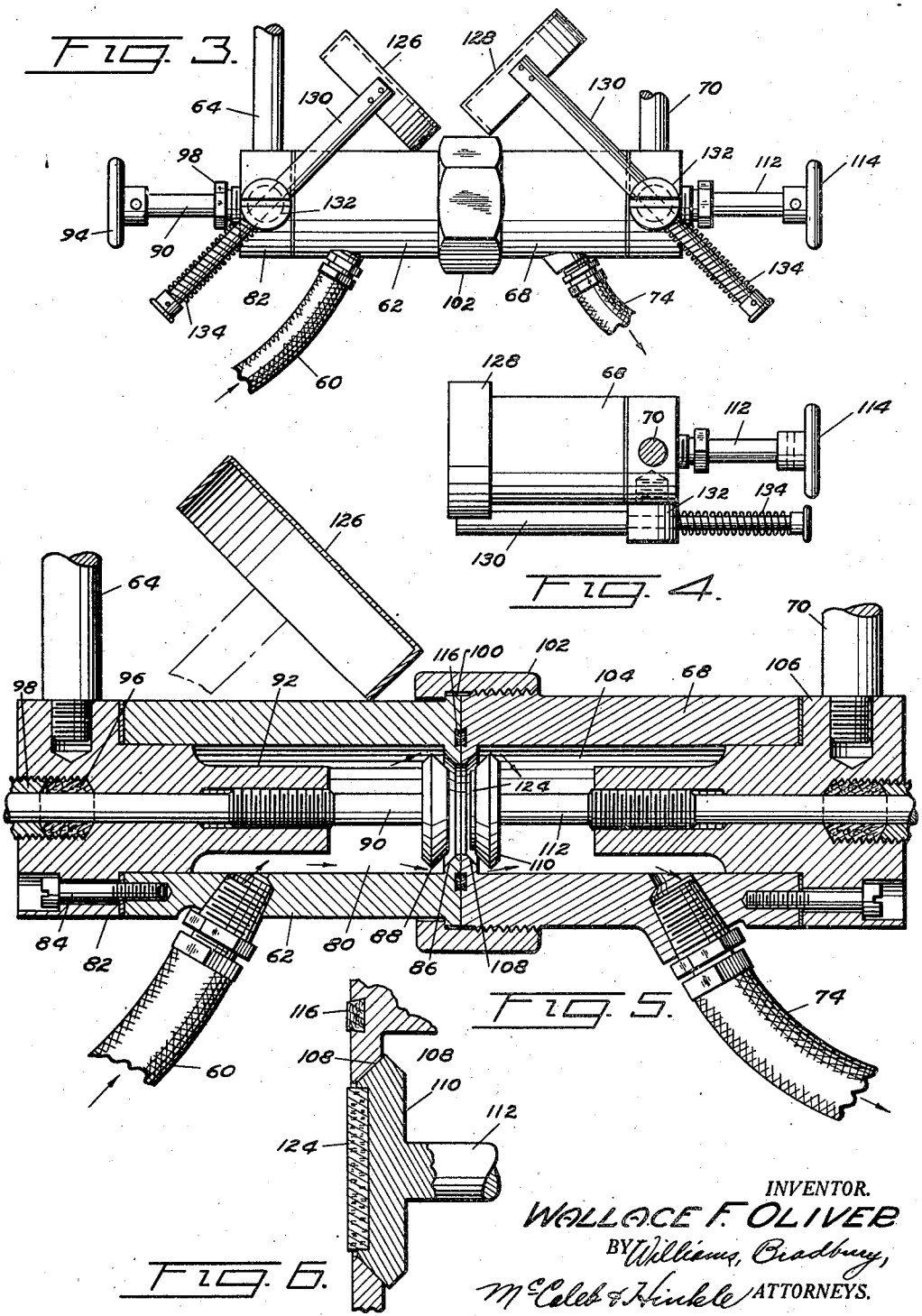

2,120,677

UNITED STATES PATENT OFFICE 2,120,677

VALVED COUPLING FOR HYDRAULIC BRAKES

Wallace F. Oliver, Detroit, Mich., assignor to Hydraulic Brake Company, Detroit, Mich., a corporation of California Original application June 6, 1932, Serial No. 615,651, now Patent No. 2,065,017, dated December 22, 1936. Divided and this application June 30, 1934, Serial No. 733,221

3 Claims. (Cl. 137—69)

This invention relates to hydraulic brakes, and particularly to hydraulic brakes adapted for use on automotive vehicles of the tractor and trailer type.

In present trucking practice, it is common to provide a tractor vehicle utilized to haul one or more trailer vehicles readily attachable to and detachable from the tractor vehicle.

An object of my invention is to provide a novel means for coupling the braking mechanism of the trailer vehicle with that of the tractor vehicle.

Another object is to provide means for positively sealing the fluid conduits on the several vehicles when the braking systems of the vehicles are disconnected from each other.

Another object is to provide simple and effective means for maintaining the fluid in the brake mechanism of the tractor and trailer vehicles under pressure prior to an uncoupling operation.

Another object is to provide a coupling means for the conduits of tractor and trailer vehicles which may be connected and disconnected without the loss of fluid therefrom.

Other objects and advantages will become apparent as the description proceeds.

Fig. 1 is an elevation, partially in section, showing a tractor and trailer in coupled relation and illustrating the braking mechanism of the two vehicles;

Fig. 2 is a diagrammatic view of the braking mechanism of the vehicles shown in Fig. 1;

Fig. 3 is an elevation of the coupling means for the brake mechanisms of the two vehicles;

Fig. 4 is a plan view of one of the elements of the coupling mechanism shown in Fig. 3;

Fig. 5 is an enlarged sectional view of the mechanism shown in Fig. 3; and

Fig. 6 is a sectional view of a detail of the coupling means.

Referring to the drawings, 10 indicates a conventional automobile truck constituting the tractor vehicle, connected as by a pin and link coupling 12 with a trailer 14. The truck is provided with the usual brake pedal 16 pivoted as at 18 to the frame of the vehicle and provided with an arm 20 attached to a link 22 for actuating a lever 24 splined to an oscillable shaft 26.

The shaft 26 extends into a housing 28 providing a fluid reservoir. This reservoir contains a compression cylinder 30 having therein a piston 32 adapted to be reciprocated by an arm 34 likewise splined to the shaft 26. The reservoir 28, cylinder 30, and attendant mechanism, constitute a reservoir and a master cylinder unit of a hydraulic brake system which may be of any preferred type.

The discharge end of the compression cylinder 30 communicates with conduits 36 leading to wheel cylinders 38. These wheel cylinders may be of any preferred type. As shown, the cylinders 38 are arranged between the separable ends of brake shoes 40 and 42 pivoted on a fixed support 44 on an axle, and the brake shoes are returned to retracted position by a spring 46.

In the present instance, the foot pedal pressure is augmented by a vacuum booster comprising a vacuum cylinder 48 connected to the intake manifold 50 of a prime mover by a conduit 52 having interposed a valve 54 controlled by the position of the foot pedal, and the vacuum cylinder has a piston 56 connected to the link 22.

The discharge end of the compression cylinder 30 also communicates with a conduit 58 having a flexible section 60 leading to a coupling member 62 mounted on a pin 64 rotatable and vertically slidable in a bracket 66 secured to the truck frame. The coupling member 62 is adaptable for cooperation with a similar coupling member 68, similarly mounted on a pin 70 supported by a bracket 72 attached to the trailer frame.

The pin 70 is preferably coaxial with the pin of the coupling means 12. The coupling member 68 is connected to the flexible portion 74 of a conduit 76 having branches leading to wheel cylinders 78 which may be identical with the wheel cylinders on the truck. The brake shoes and attendant mechanism actuated by the wheel cylinders 78 may be identical with that previously described as used on the truck.

Referring particularly to Figs. 3 to 6, inclusive, it is apparent that the coupling member 62 includes a cylinder 80 in open communication with the flexible conduit portion 60. The cylinder 80 is closed at one end by a head 82 secured to the cylinder as by suitable bolts 84. The other end of the cylinder is provided with a valve seat 86 adapted to be closed by a valve 88 when the tractor and trailer are disconnected.

The valve 88 has a valve stem 90 threadedly engaging a reduced extension 92 of the head 82 and is provided with a hand wheel 94 for opening and closing the valve. A packing 96 and gland nut 98 are provided to prevent leakage around the valve stem.

The cylinder 80 is provided with a flange 100 for retaining coupling sleeve 102 which is adapted to be threadedly engaged with the cylinder 104 of the complementary coupling member when the parts are in coupled relation. The cylinder 104 is provided with a head 106, a valve seat 108, a valve 110, a valve stem 112, and a hand wheel 114 substantially identical with those described in connection with cylinder 80. The contacting faces of cylinders 80 and 104 are provided with sealing rings 116 which are preferably of lead or similar material suitable for forming a leak-proof seal therebetween.

With the parts in coupled relation and the valves 88 and 110 in open position, as indicated in Figs. 2 and 3, the conduit 76 of the trailer is in free communication with conduits 36 and the discharge end of the compression cylinder 30, so that operation of the foot-pedal 16 will apply the brakes on both the tractor and trailer. If it be desired to disconnect the trailer from the tractor and leave the brakes of the trailer in set position, the driver first depresses the foot-pedal 16 until the desired pressure is created on the brakes of the tractor and trailer, whereupon the driver uses his other foot to move the slide 118 into engagement with one of the teeth 120 on the foot-pedal 16, thereby locking the foot pedal against the action of the return spring 122, and holding the brake systems of the tractor and trailer under pressure. The driver then descends from the cab of the truck and rotates the hand wheels 94 and 114 to close the valves 88 and 110.

The valve 110 is provided with a compressible gasket 124 of cork or other suitable material, which completely fills the very small space between the opposed ends of the valves, thereby preventing the presence of any liquid between the ends of the coupling members 62 and 68 when they are uncoupled, and thus avoiding any possibility of loss of fluid as a result of the uncoupling operation.

After valves 88 and 110 are tightly seated, the driver unscrews coupling ring 102 until the coupling members 62 and 68 are disconnected. After the coupling members 62 and 68 are disconnected, they may be swung so that their ends are no longer in contact, whereupon covers 126 and 128 may be moved to positions covering the ends of the coupling members, thereby protecting these ends from dirt and corrosion. The covers 126 and 128 are carried by rods 130 slidably mounted in pivot pins 132 and held in selected positions by springs 134.

After the driver has disconnected the coupling members 62 and 68, he may withdraw the pin of the coupling 12, release the brake on the tractor by withdrawing the slide 118, and move the tractor away under its own power, leaving the trailer in any desired location with its brake set so that it cannot move therefrom.

It may be found desirable to move the trailer from place to place without first connecting it to a tractor, hence it is necessary to provide means for releasing the brakes on the trailer to permit such movement. For this purpose the brake mechanism of the trailer has a cylinder 136 having therein a piston 138 normally maintained in its advanced position by a hand brake lever 140 having the usual ratchet mechanism 142.

When it is desired to move the trailer, it is only necessary to release the ratchet mechanism 142, thereby permitting the piston 138 to move to retracted position, whereupon the brakes on the trailer are immediately released. The trailer may then be pushed from one location to another, and when it is again desired to set the brakes of the trailer it is only necessary to pull back on the hand brake lever 140 to advance the piston 138 and lock it in such advanced position. The cylinder 136 is preferably provided with a filling opening and removable cover therefor, indicated by the reference character 144 in Fig. 2 of the drawings.

The present invention is a division of my pending application Ser. No. 615,651, filed June 6, 1932, and now Patent No. 2,065,017, granted Dec. 22, 1936, and is made in accordance with requirements of the United States Patent Office under provision of Rule 42.

It will be understood that various forms of the invention other than those described above may be used without departing from the spirit or scope of the invention.

I claim:

1. In mechanism of the class described, the combination of a pair of coupling members, each having an annular sealing surface and a valve seat, a valve associated with each of said seats, means for operating said valves, a compressible gasket for expelling all fluid from between said coupling members prior to an uncoupling operation, and means for detachably connecting said coupling means.

2. In mechanism of the class described, the combination of a coupling member having a sealing surface, a valve seat adjacent said surface, a valve for coacting with said seat, means for closing said valve, a cover for said surface and valve, a pivotal mounting for said cover, and resilient means for holding said cover in selected positions.

3. In mechanism of the class described, the combination of a pair of cylinders each having an annular sealing surface and a valve seat at one end and a head at its other end, means detachably connecting the cylinders with their annular sealing surfaces adjacent one another, a valve mounted in the head of each cylinder for cooperation with the respective seats, means carried by one of the valves for expelling all fluid from between the valves, covers for the valve seats and valves, and means supporting the covers for movement into and from position including means for retaining the covers in selective position.

WALLACE F. OLIVER.